(12) United States Patent
Iwasaki

(10) Patent No.: US 10,110,812 B2
(45) Date of Patent: Oct. 23, 2018

(54) IMAGE PICKUP APPARATUS AND IMAGE PICKUP METHOD

(71) Applicant: Olympus Corporation, Shibuya-ku, Tokyo (JP)

(72) Inventor: Hiroaki Iwasaki, Niiza (JP)

(73) Assignee: Olympus Corporation, Tokyo (JP)

( * ) Notice: Subject to any disclaimer, the term of this patent is extended or adjusted under 35 U.S.C. 154(b) by 282 days.

(21) Appl. No.: 15/058,825

(22) Filed: Mar. 2, 2016

(65) Prior Publication Data
US 2017/0054905 A1    Feb. 23, 2017

(30) Foreign Application Priority Data

Aug. 19, 2015 (JP) ................... 2015-162037

(51) Int. Cl.
  *H04N 7/00* (2011.01)
  *H04N 5/232* (2006.01)
  *H04N 5/353* (2011.01)
  *H04N 5/235* (2006.01)

(52) U.S. Cl.
  CPC ....... *H04N 5/23238* (2013.01); *H04N 5/2355* (2013.01); *H04N 5/3532* (2013.01); *H04N 5/2353* (2013.01)

(58) Field of Classification Search
  CPC .. H04N 5/2325; H04N 5/235; H04N 5/23238; H04N 5/2355; H04N 5/3532
  USPC ............................................. 348/36
  See application file for complete search history.

(56) References Cited

U.S. PATENT DOCUMENTS

| | | | |
|---|---|---|---|
| 8,698,947 B2* | 4/2014 | Ryu | H04N 5/2353 348/363 |
| 2011/0181754 A1* | 7/2011 | Iwasaki | H04N 5/2353 348/230.1 |
| 2011/0242368 A1* | 10/2011 | Haneda | H04N 5/235 348/239 |
| 2012/0293708 A1* | 11/2012 | Ryu | H04N 5/2353 348/363 |

FOREIGN PATENT DOCUMENTS

JP    2010-136058    6/2010

* cited by examiner

*Primary Examiner* — Gims S Philippe
(74) *Attorney, Agent, or Firm* — John C. Pokotylo; Pokotylo Patent Services

(57) ABSTRACT

An image pickup apparatus includes an image sensor that reads out an image in a time period Te, a mechanical shutter that opens and closes in a traveling time Tm that satisfies Te>Tm, a system control section that controls the mechanical shutter to set a time period from opening to closing of the mechanical shutter to T1 and causes the image sensor to continuously read out images of a plurality of frames in a time period T2 that satisfies T1>T2, and an image combining section that generates a combined image from the images of the plurality of frames. The system control section performs control to fully read out electric charges exposed in any pixel in the time period T1.

11 Claims, 8 Drawing Sheets

IMAGE PICKUP APPARATUS AND IMAGE PICKUP METHOD

CROSS REFERENCE TO RELATED APPLICATION

This application claims benefit of Japanese Application No. 2015-162037 filed in Japan on Aug. 19, 2015, the entire contents of which are incorporated herein by this reference.

BACKGROUND OF THE INVENTION

1. Field of the Invention

The present invention relates to an image pickup apparatus and an image pickup method for acquiring and combining image data of a plurality of frames.

2. Description of the Related Art

In recent years, as an image pickup apparatus such as a digital camera, there has been proposed an image pickup apparatus that combines images of a plurality of frames continuously read out from an image sensor to thereby realize an image having a new image processing effect that cannot be represented by a photographed image of one frame or acquire an image that cannot be easily obtained by photographing of one frame. The image pickup apparatus has been sold in a market.

For example, Japanese Patent Application Laid-Open Publication No. 2010-136058 (Patent Literature 1) proposes an image pickup apparatus that easily obtains a panning-photographed image by combining images of a plurality of frames.

When panning photographing is performed with a conventional camera, it is not easy to photograph a panning-photographed image as intended by a photographer. More specifically, the photographer sometimes does not know shutter speed suitable for panning photographing that makes a panning amount of a background moderate. Further, the shutter speed suitable for the panning photographing is shutter speed set rather long to allow the background to flow. Therefore, if photographing is performed by setting only the shutter speed suitable for the panning photographing without appropriately setting a diaphragm value and ISO sensitivity, in some case, an exposure amount is too large and excessive exposure occurs.

On the other hand, the image pickup apparatus described in Patent Literature 1 combines images of a plurality of frames consecutively photographed with appropriate exposure to obtain a panning-photographed image. Therefore, it is possible to obtain not only a combined image with appropriate exposure but also a combined image photographed at shutter speed that can show a panning photographing effect desired by the photographer. Further, in the technique described in Patent Literature 1, an object (a background) desired to be panned and an object (a main object) not desired to be panned are detected out of a plurality of objects in image data. Images are combined such that the main object is not panned and the background is panned to make it easier to perform the panning photographing.

When consecutively-photographed images are combined to generate an image of one frame as described in Patent Literature 1, as a consecutive photographing method, it is conceivable to adopt a method of mechanical shutter consecutive photographing for repeatedly performing opening and closing actions of a mechanical shutter and a method of consecutive photographing by a so-called electronic shutter for repeatedly performing readout from an image sensor in a state in which a mechanical shutter is kept opened (hereinafter referred to as electronic readout consecutive photographing as appropriate) like moving image photographing of a general CMOS image sensor.

A panning-photographed image generated by combining images of a plurality of frames photographed by the mechanical shutter consecutive photographing or the electronic readout consecutive photographing is an image different from a panning-photographed image photographed in one frame by a professional photographer, who is familiar with panning photographing, using the mechanical shutter.

More specifically, when the consecutive photographing is performed by the mechanical shutter, a shutter is once closed after an image of one frame is photographed and, thereafter, an action for opening the shutter is performed to photograph an image of the next frame. Therefore, exposure omission in which photographing is not performed occurs among continuous frames because of a time period (e.g., approximately $\frac{1}{10}$ (sec)) from the closing to the opening of the shutter. For example, photographing is generally performed at shutter speed of approximately $\frac{1}{30}$ to $\frac{1}{2}$ (sec) when motor sports, flying of wild birds, and the like are panning-photographed. Therefore, exposure omission of approximately $\frac{1}{10}$ (sec) in order close to the shutter speed occurs among respective images in the mechanical shutter consecutive photographing. When images of a plurality of frames obtained by performing the consecutive photographing are combined to generate a panning-photographed image, there is no sense of discomfort in a main object because the main object stands still. However, a panning state of a background portion becomes discontinuous because of the exposure omission. Therefore, in combining the images to generate the panning-photographed image using the mechanical shutter consecutive photographing, an image in a natural panning state like a panning-photographed image photographed as an image of one frame by a professional photographer cannot be obtained.

On the other hand, the electronic readout consecutive photographing is performed as explained below. In a CMOS image sensor used in a digital camera in recent years, in general, respective signals of a plurality of pixels arranged in row and column directions are sequentially read out for each of rows. At a point in time when readout of accumulated pixel signals is completed for each of the rows, signal accumulation of the pixels in the row is started and readout of the next row is performed. In this way, in the electronic readout consecutive photographing, the consecutive photographing can be performed without interrupting exposure of the respective rows. Therefore, the exposure omission in the case of the mechanical shutter consecutive photographing does not occur. However, a time period from a start of readout of a top row of an image to completion of readout of a bottom row (a so-called traveling time of the electronic shutter) is long compared with a traveling time of the mechanical shutter. As a specific example, whereas the mechanical shutter requires approximately 2 to 4 (msec) to travel from an upper end to a lower end of an image sensor, a time period required for electronic readout of one screen in the general CMOS image sensor is approximately 10 to 100 (msec). Therefore, exposure timing shifts between an upper side portion and a lower side portion of an image when the electronic shutter is used. Consequently, when a moving object is photographed or when a camera itself is moved to photograph an object as in the panning photographing, a phenomenon in which the object is unnaturally distorted occurs in a photographed image.

This is more specifically explained with reference to the drawings. For example, as shown in FIG. 4, it is assumed that a main object MO such as a car traveling from a right side to a left side with respect to a stationary background BO is panning-photographed by directing a camera to the main object MO and swinging the camera from right to left.

At this point, when images of a plurality of frames consecutively photographed by the mechanical shutter are combined, exposure omission occurs among the images of the respective frames as explained above. Therefore, as shown in FIG. 11, an image with an unnatural panning state is obtained in which panning of the background BO is discontinuously interrupted. FIG. 11 is a diagram showing an example of a panning-photographed image SP1 generated by combining the images of the plurality of frames consecutively photographed by the mechanical shutter.

When the mechanical shutter is not used and only the electronic shutter (in an example shown in FIG. 12, an electronic shutter traveling down to up is assumed) is used for all the images of the plurality of frames, a shift of exposure timing on an upper side and a lower side of an image is large concerning all the frames including a first one frame and a last one frame. Therefore, as shown in FIG. 12, a combined image is an unnatural image in which the background BO is distorted more to the right side toward the upper side of the image. FIG. 12 is a diagram showing an example of a panning-photographed image SP2 generated by combining the images of the plurality of frames consecutively photographed by the electronic shutter.

In an image pickup apparatus that combines consecutively-photographed images to generate an image of one frame, the image is an unnatural image compared with an image panning-photographed as an image of one frame because of exposure omission among frames if a method of consecutive photographing is the mechanical shutter consecutive photographing and because of object distortion due to a shift of exposure timing in respective rows if the method of consecutive photographing is the electronic readout consecutive photographing.

The combined image is the unnatural image in this way not only in the case of combination processing for simplifying the panning photographing described above but also in the case of various kinds of image combination processing implemented in digital cameras proposed and sold in the market to date, for example, various kinds of image combination processing for combining images of a plurality of frames such as image combination processing for consecutively photographing images of a plurality of frames with different exposure levels and combining the images to generate an image having a larger dynamic range than an image of one frame and image combination processing for averaging and combining images of a plurality of frames to reduce random noise.

SUMMARY OF THE INVENTION

An image pickup apparatus according to an aspect of the present invention includes: an image pickup device configured to receive an object light image in a plurality of two-dimensionally arrayed pixels, generate image data, and read out the image data in a readout time Te; a mechanical shutter disposed on a front surface of the image pickup device and configured to control an exposure time of the image pickup device according to opening and closing actions in a traveling time Tm that satisfies Te>Tm; a control section configured to control the mechanical shutter to set a total exposure time from opening to closing of the mechanical shutter to T1 and control, with an electronic shutter, the image pickup device to continuously read out image data of a plurality of frames in a one-frame exposure time T2 that satisfies T1>T2; and an image combining section configured to combine the image data of the plurality of frames to generate combined image data of at least one frame. The control section performs control to fully read out electric charges exposed in any pixel in the total exposure time T1.

An image pickup method according to another aspect of the present invention includes: an image pickup step for receiving an object light image in a plurality of two-dimensionally arrayed pixels of an image pickup device, generating image data, and reading out the image data in a readout time Te; an exposure step for controlling, with a mechanical shutter disposed on a front surface of the image pickup device, an exposure time of the image pickup device according to opening and closing actions in a traveling time Tm that satisfies Te>Tm; a control step for controlling the mechanical shutter to set a total exposure time from opening to closing of the mechanical shutter to T1 and controlling, with an electronic shutter, the image pickup device to continuously read out image data of a plurality of frames in a one-frame exposure time T2 that satisfies T1>T2; and an image combining step for combining the image data of the plurality of frames to generate combined image data of at least one frame. The control step is a step for performing control to fully read out electric charges exposed in any pixel in the total exposure time T1.

DETAILED DESCRIPTION OF THE PREFERRED EMBODIMENTS

Embodiments of the present invention are explained below with reference to the drawings.

First Embodiment

Figure 1:
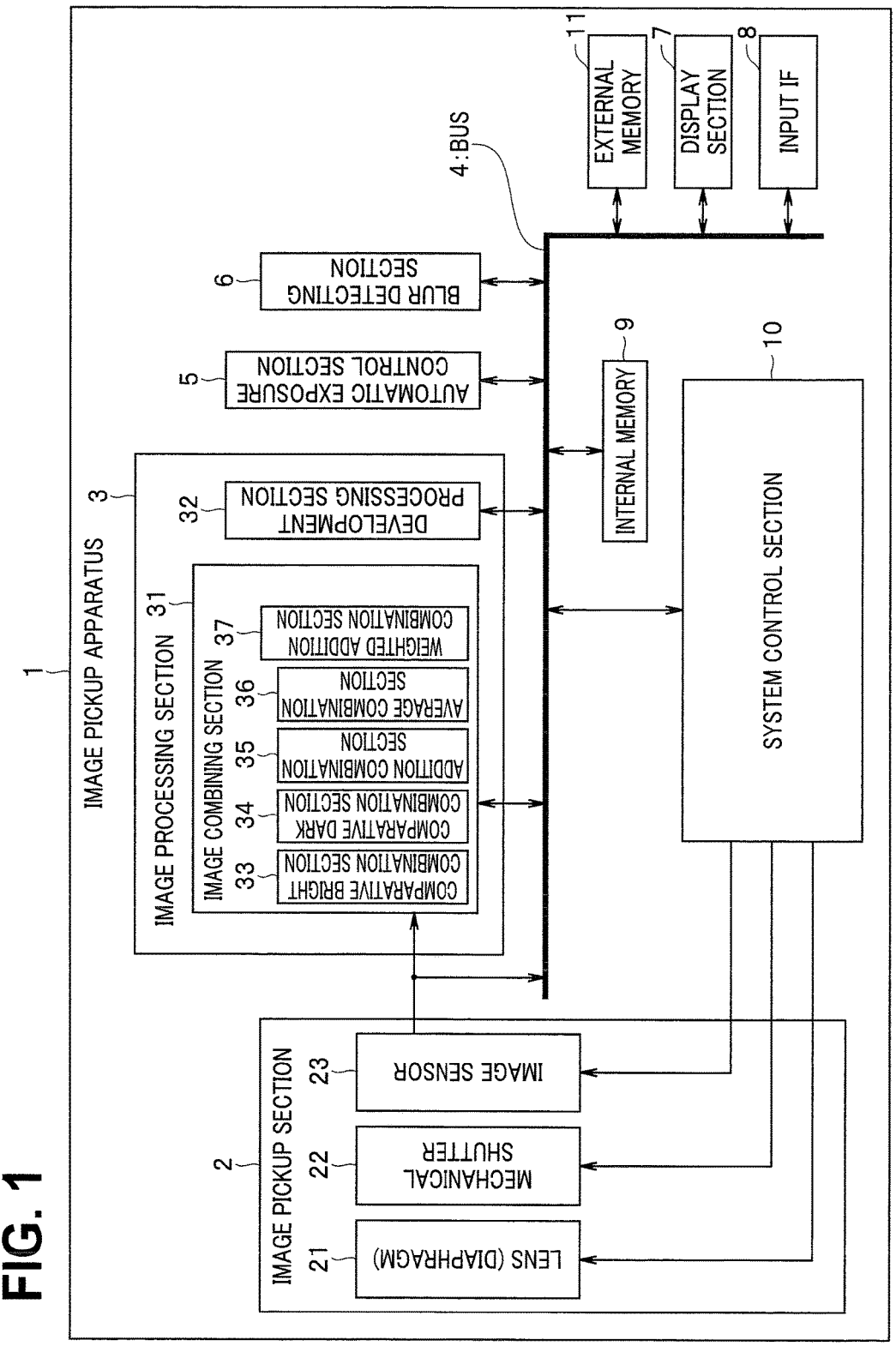
FIG. 1 is a block diagram showing a configuration of an image pickup apparatus in a first embodiment of the present invention.

FIGS. 1 to 10 are diagrams showing a first embodiment of the present invention. FIG. 1 is a block diagram showing a configuration of an image pickup apparatus 1.

The image pickup apparatus 1 according to a preferred embodiment of the present invention is configured as, for example, a digital camera.

The image pickup apparatus 1 includes an image pickup section 2, an image processing section 3, a bus 4, an automatic exposure control section 5, a blur detecting section 6, a display section 7, an input IF (interface) 8, an internal memory 9, and a system control section 10. Note that an external memory 11 is also shown in FIG. 1. However, the external memory 11 can be configured by a memory card or the like detachably attachable to the image pickup apparatus 1. Therefore, the external memory 11 does not have to be a component peculiar to the image pickup apparatus 1.

The image pickup section 2 includes a lens 21, a mechanical shutter 22, and an image sensor 23.

The lens 21 is an optical system that forms an object light image (an optical image of an object) on the image sensor 23. The lens 21 includes, on an inside, an optical diaphragm that changes a size of an aperture according to a diaphragm value, which is a control parameter for adjusting an exposure amount.

Note that, in the explanation in the present embodiment, it is assumed that the lens 21 is configured integrally with a camera main body. However, naturally, the lens 21 may be configured to be detachably attachable to the camera main body as an interchangeable lens.

The mechanical shutter 22 is configured as, for example, focal plane shutter and disposed on a front surface of the image sensor 23. The mechanical shutter 22 opens and closes a front curtain and a rear curtain for performing light blocking to thereby cause a photographing light beam from the lens 21 to reach the image sensor 23 or blocks the photographing light beam not to reach the image sensor 23. At this point, a time period from a traveling start of the front curtain until a traveling start of the rear curtain is shutter speed. The mechanical shutter 22 is controlled by the system control section 10 on the basis of shutter speed determined on the basis of a detection result of the automatic exposure control section 5.

When a traveling time required for the mechanical shutter 22 (the front curtain and the rear curtain) to pass an image pickup surface of the image sensor 23 is represented as Tm and a readout time required for the image sensor 23 to perform readout for all lines (a so-called traveling time of the electronic shutter) is represented as Te, the mechanical shutter 22 controls an exposure time of the image sensor 23 according to opening and closing actions in the traveling time Tm that satisfies Te>Tm.

The image sensor 23 includes an image pickup device such as a CMOS image sensor or a CCD image sensor. The image sensor 23 receives, with a plurality of two-dimensionally arrayed pixels, an object light image formed by the lens 21, converts the object light image into an electric signal for each of the pixels to generate image data, reads out the generated image data, and outputs the image data to the image processing section 3 and the bus 4.

The bus 4 is a signal line for performing transmission and reception of signals among the respective sections in the image pickup apparatus 1. In an example shown in FIG. 1, the image pickup section 2, the image processing section 3, the automatic exposure control section 5, the blur detecting section 6, the display section 7, the input IF 8, the internal memory 9, the system control section 10, and the external memory 11 are connected to the bus 4.

The image processing section 3 applies image processing to image data outputted from the image sensor 23. The image processing section 3 includes an image combining section 31 and a development processing section 32.

The image combining section 31 combines image data of a plurality of frames to generate combined image data of at least one frame. The image combining section 31 includes a comparative bright combination section 33, a comparative dark combination section 34, an addition combination section 35, an average combination section 36, and a weighted addition combination section 37. That is, the image combining section 31 subjects image data of a plurality of frames continuously read out from the image sensor 23 and stored in the internal memory 9 according to necessity to comparative bright combination processing, comparative dark combination processing, addition combination processing, average combination processing, or weighted addition combination processing for each of pixels corresponding to the image data and generates a combined image. The combination processing is not limited to combination processing performed by selecting any one of the kinds of processing. The image combining section 31 may perform a plurality of the kinds of processing and generates a plurality of kinds of combined images.

The comparative bright combination section 33 performs the comparative bright combination processing explained below. The comparative bright combination section 33 compares, concerning the image data of the plurality of frames stored in the internal memory 9, pixel data in pixel positions respectively corresponding to the image data.

The "corresponding pixel positions" are the same pixel position (address) when no positional shift occurs in the image data of the plurality of frames. However, when a positional shift occurs, it is desirable to set pixel positions having a correspondence relation after positional shift correction is performed. In particular, in the case of the panning photographing, the positional shift correction is processing for correcting a positional shift concerning a main object (concerning a background, a position may shift).

The comparative bright combination section 33 configures comparative bright combined image data using larger pixel data in a result of the comparison of the pixel data, that is, brighter pixel data. By performing, concerning all the image data of the plurality of frames, such processing performed concerning all the pixel positions, a comparative bright image configured by brightest pixel data is generated.

According to such processing, the image data can be combined such that a brighter object is more conspicuous. In this way, for example, if the comparative bright combination processing is performed when the main object is brighter than the background, it is possible to generate a combined image in which the main object is more emphasized.

The comparative dark combination section 34 compares the pixel data in the corresponding pixel positions in substantially the same manner as the comparative bright combination section 33. However, the comparative dark combination section 34 configures comparative dark combined image data using any smaller pixel data in a result of the comparison, that is, darker pixel data.

According to such processing, the image data can be combined such that a darker object is more conspicuous. In this way, for example, if the comparative dark combination processing is performed when the main object is darker than the background, it is possible to generate a combined image in which the main object is more emphasized.

Therefore, for example, in the panning photographing, by performing combination using the comparative bright combination section 33 when the main object (e.g., a car in panning photographing of motor sports or a bird in photographing of a flying bird) is brighter than the background and, on the other hand, using the comparative dark combination section 34 when the main object is darker than the background, it is possible to clearly project the main object with respect to the background and it is possible to obtain a more impressive panning-photographed combined image.

The addition combination section 35 performs combination processing explained below. The addition combination section 35 adds up, concerning the image data of the plurality of frames stored in the internal memory 9, pixel data in pixels positions respectively corresponding to the image data. The addition combination section 35 configures addition combined image data using pixel data of an addition result.

Note that, for example, in the panning photographing, by adding up and combining consecutively-photographed images of a plurality frames, an image with exposure same as exposure performed for a total of respective exposure times of the plurality of frames is generated. When a position of the main object reflected in the consecutively-photographed image data of the plurality of frames shifts in each of the images, by adding up and combining the images while adjusting the position of the main object as explained above, it is possible to obtain a combined image in which the main object is more clearly reflected.

The average combination section 36 performs combination processing explained below. The average combination section 36 averages, concerning the image data of the plurality of frames stored in the internal memory 9, pixel data in pixel positions respectively corresponding to the image data. The average combination section 36 configures average combined image data using pixel data of an averaging result.

Note that, for example, in the panning photographing, by averaging and combining the images while adjusting the position of the main object like the addition combination section 35 described above, it is possible to obtain a combined image in which the main object is more clearly reflected.

Further, in a bright place such as an outdoor in daytime, when it is attempted to perform photographing with a slow shutter suitable for the panning photographing, even if ISO sensitivity is reduced to narrow a diaphragm, the main object is sometimes reflected brighter than proper brightness. In addition, since a depth of field increases when the diaphragm is narrowed, it is also assumed that a photographer performs photographing by opening the diaphragm with a diaphragm priority photographing mode (or a lens, a diaphragm mechanism of which can be manually changed) with intention of further blurring the background (reducing the depth of field) with respect to the focused main object. In this case, the main object tends to be reflected much brighter than the proper brightness (therefore, to obtain an image with the proper brightness in such a case, it is necessary to suppress an incident light amount using an ND filter or the like). On the other hand, if shutter speed of each one frame is set to shutter speed at which proper exposure is obtained and consecutive photographing is performed and image data obtained by the consecutive photographing is subjected to the average combination processing, it is possible to obtain a panning-photographed combined image with a proper exposure and a proper panning state.

The weighed addition combination section 37 adds up the pixel data in the corresponding pixel positions in substantially the same manner as the addition combination section 35 described above. However, in the addition, the weighted addition combination section 37 performs light or heavy weighting for each of the frames. By adjusting the weighting, it is possible to perform addition combination putting importance on a desired image among the images of the plurality of frames.

Consequently, for example, when the panning photographing is performed, if an image in which the main object is blurred and reflected is included in a part of a plurality of frames acquired by electronic readout consecutive photographing, by combining images with a weight coefficient set larger for a frame having a smaller blur, it is possible to reduce a blur of the main object in a combined image and obtain a combined image in which the main object is clearly reflected.

For example, if weight of an image of a first frame among the images of the plurality of frames is increased and the addition combination is performed, a first position of the moving object clearly appears in the image. An image is obtained in which it is possible to grasp according to a panning state from the first position in which direction and how movement is performed thereafter. Conversely, if weight of an image of a last frame among the images of the plurality of frames is increased and the addition combination is performed, an image is obtained in which it is possible to grasp according to a panning state to a last position (a panning state leaving traces from the last position) in which direction and how movement to the last position is performed.

The development processing section 32 performs, as development processing, respective kinds of processing such as demosaicking processing, white balance adjustment processing, noise reduction processing, YC signal generation processing, gamma correction processing, resize processing, and image compression processing on the combined image data, which is RAW image data, generated by the image combining section 31. The resize processing is processing for converting the number of pixels of the image data read out from the image sensor 23 into another number of pixels and is, for example, processing for adjusting the number of pixels to the number of displayed pixels of the display section 7.

The automatic exposure control section 5 performs AE (auto exposure) control of the image pickup apparatus 1. The automatic exposure control section 5 automatically detects, on the basis of the image data read out from the image sensor 23, ISO sensitivity, a diaphragm value, shutter speed (an exposure time), and the like with which photographing can be performed under exposure conditions including a proper exposure time, that is, target exposure. The ISO sensitivity is a control parameter for controlling a signal amplification amount of the image data. The diaphragm value is a control parameter for controlling a size of an aperture of the diaphragm of the lens 21. The shutter speed is detected as an exposure time in which proper exposure is obtained (a proper exposure time) and used as a control parameter for controlling a time interval of respective traveling starts of the front curtain and the rear curtain of the mechanical shutter 22 in normal image photographing of one frame. However, when the electronic shutter is used, the shutter speed is also used as a control parameter for controlling a time interval of the readout of the image sensor 23.

The blur detecting section 6 includes a device that detects angular velocity such as a gyro sensor. The blur detecting section 6 detects a blur amount of the image pickup apparatus 1. The blur detecting section 6 also functions as an acceleration detecting section that detects acceleration. In the panning photographing, the blur detecting section 6 detects a movement amount at time when the photographer moves the image pickup apparatus 1 according to a movement of an object.

The display section 7 includes a rear display section such as a TFT (thin film transistor) liquid crystal or an organic EL (electro luminescence), an EVF (electronic viewfinder), or the like. The display section 7 displays an image developed by the development processing section 32.

The input IF 8 is an operation section for receiving operation by the photographer and performing various kinds of setting and instructions to the image pickup apparatus 1. The input IF 8 includes an operation member such as a power button for turning on and off a power supply of the image pickup apparatus 1 or a release button for operating a photographing start and a photographing end. The input IF 8 further includes a touch panel or the like for performing a touch operation input in the rear display section or the like of the display section 7. The input IF 8 functions as a user interface section for setting and inputting photographing conditions including an exposure time T1 explained below.

The internal memory 9 is a storing section that stores the image data read out from the image sensor 23 or image data halfway in the image processing performed by the image processing section 3 and also stores various processing programs, setting values, and the like necessary for an operation of the image pickup apparatus 1. The internal memory 9 is configured by, for example, a nonvolatile memory such as a flash memory or an SDRAM or a volatile memory (or by combining the nonvolatile memory and the volatile memory).

The external memory 11 is a memory card or the like insertable into the camera main body or a nonvolatile storage medium fixed on an inside of the camera main body. The external memory 11 records the image data subjected to the development processing by the development processing section 32. During reproduction, the recorded image data is read out from the external memory 11. The image data read out from the external memory 11 can be outputted to an outside of the image pickup apparatus 1.

The system control section 10 is a control section that includes a CPU (central processing unit) or the like and controls the respective sections in the image pickup apparatus 1 according to the processing programs stored in the internal memory 9.

For example, the system control section 10 is a control section that controls, on the basis of a detection result of the automatic exposure control section 5, the mechanical shutter 22 to set a total exposure time from opening to closing of the mechanical shutter 22 to T1 and controls, with the electronic shutter, the image sensor 23 to continuously read out the image data of the plurality of frames in a one-frame exposure time T2 that satisfies T1>T2.

Figure 2:
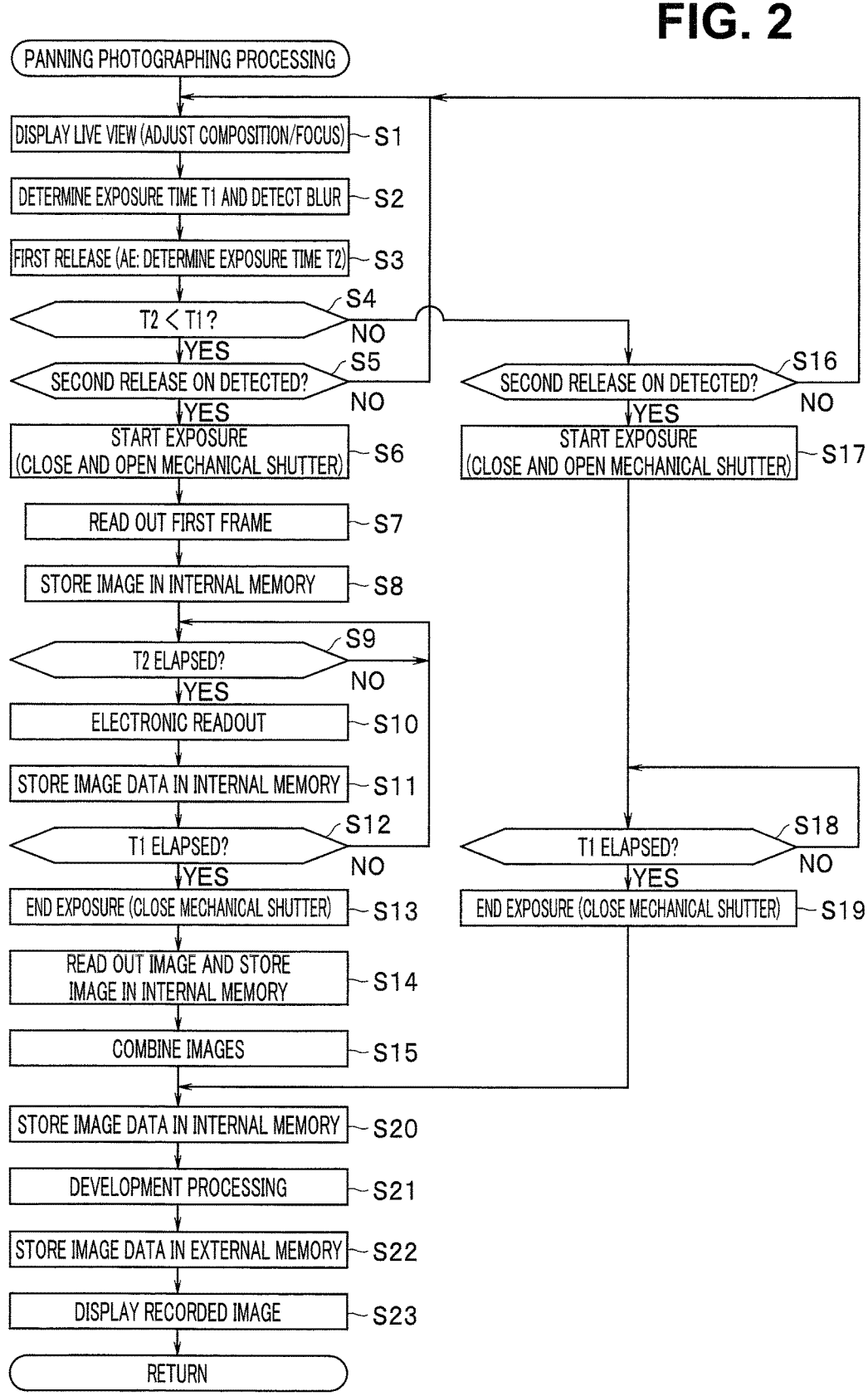
FIG. 2 is a flowchart for explaining an operation of panning-photographing processing in the image pickup apparatus in the first embodiment.

FIG. 2 is a flowchart for explaining an operation of panning photographing processing in the image pickup apparatus 1. The processing shown in FIG. 2 is executed by the system control section 10 controlling the respective sections in the image pickup apparatus 1 according to the processing programs stored in the internal memory 9 as explained above.

During not-shown main processing, when the photographer selects a panning-photographing mode via the input IF 8, the processing shown in FIG. 2 is started.

Then, first, the system control section 10 sets the mechanical shutter 22 in an open state, reads out image data from the image sensor 23 at a predetermined frame rate, and performs live view display on the display section 7 (step S1). Viewing the live view display (or an object image or the like by an optical finder), the photographer performs focus adjustment of the lens 21 and adjusts a direction of the image pickup apparatus 1 and a focal length (zoom) of the lens 21 to determine composition such that the photographer can photograph an object that the photographer desires to photograph. The photographer performs other kinds of setting related to the photographing by operating an operation button, the touch panel, or the like of the input IF 8 according to necessity.

Subsequently, the system control section 10 sets, on the basis of image data acquired in the live view, an exposure time optimum for the panning photographing (a panning photographing exposure time) as a total exposure time T1 (step S2). In the panning photographing, the photographer moves the direction of the image pickup apparatus 1 to follow the moving main object. At this point, image surface speed of an image of the main object formed on the image sensor 23 changes according to the focal length of the lens 21. Therefore, the system control section 10 automatically calculates, on the basis of the focal length of the lens 21, the panning photographing exposure time with which panning of the background can be effectively photographed and sets the calculated panning photographing exposure time as the total exposure time T1.

The system control section 10 may calculate, on the basis of a detection result of the blur detecting section 6 also functioning as the acceleration detecting section, speed for the photographer moving the direction of the image pickup apparatus 1 according to the movement of the main object and automatically set, on the basis of the calculated moving speed, the total exposure time T1 serving as the panning photographing exposure time.

In addition, the system control section 10 may calculate the panning photographing exposure time on the basis of both of the focal length of the lens 21 and the detection result of the blur detecting section 6 and automatically set the panning photographing exposure time as the total exposure time T1. That is, the system control section 10 desirably calculates an exposure time suitable for the panning photographing on the basis of at least one of the focal length of the lens 21 and the detection result of the blur detecting section 6 and sets the exposure time as the total exposure time T1.

Alternatively, the photographer may be able to correct the total exposure time T1 automatically set by the image pickup apparatus 1. The photographer may manually set the total exposure time T1 as desired without using the automatic setting by the image pickup apparatus 1.

Thereafter, when detecting that the release button is half-pressed and a first release switch is turned on, the system control section 10 performs, for example, AF (auto-focus) control processing and AE control processing as processing during the first release ON (step S3).

The AF control processing is processing for extracting a contrast signal from image data repeatedly read out from the image sensor 23 in the live view and drive-controlling a focus lens in the lens 21 to adjust a focus such that the extracted contrast signal takes a maximum value.

The AE control processing is processing for extracting a luminance equivalent signal from the image data repeatedly read out from the image sensor 23 in the live view and automatically detecting and controlling a diaphragm value, ISO sensitivity, and shutter speed (an exposure time) with which brightness of an image calculated from the extracted luminance equivalent signal is proper (an image has proper exposure).

However, depending on setting of the image pickup apparatus 1, at least one (one or both) of functions of AF and AE may be turned off. The photographer may manually set a position of the focus lens (focus adjustment), a diaphragm value, ISO sensitivity, shutter speed, and the like via the input IF 8 or the like.

In the AE control processing, the ISO sensitivity and the diaphragm value are adjusted to set the one-frame exposure time $T2$ and the total exposure time $T1$ equal ($T2=T1$) as much as possible. This is because, if $T1=T2$, effective panning photographing can be performed with proper exposure by one-frame photographing using only the mechanical shutter 22. However, as explained above, in a bright environment such as an outdoor, even if the ISO sensitivity is set low and the diaphragm is narrowed, overexposure sometimes occurs if $T2=T1$. In a general digital camera, minimum ISO sensitivity that can be set is ISO100 and a minimum diaphragm value that can be set is approximately F22. Therefore, if photographing is performed at the shutter speed of the panning photographing (in general, approximately 1/30 to 1/2 (sec)), overexposure sometimes occurs depending on brightness of an object. In this case, the one-frame exposure time $T2$ and the total exposure time $T1$ have to be set unequal ($T2 \neq T1$).

Therefore, when determining the total exposure time $T1$ serving as the panning photographing exposure time and the one-frame exposure time $T2$ in which proper exposure is obtained, the system control section 10 further determines whether or not the one-frame exposure time $T2$ is shorter than the total exposure time $T1$ (step S4).

When it is determined that $T2<T1$, the electronic readout consecutive photographing is performed in a period in which the mechanical shutter 22 is open in the one-frame exposure time $T2$ in which proper exposure is obtained. Therefore, the system control section 10 determines on the basis of an input from the input IF 8 whether or not a second release switch is turned on (step S5). When the composition and the focus are adjusted, the photographer fully presses the release button to start photographing. The second release switch is turned on in association with the full pressing of the release button.

When determining that the second release switch is off, the system control section 10 returns to step S1 and repeatedly performs the processing explained above.

When determining in step S5 in this way that the second release switch is on, the system control section 10 starts exposure by once closing the mechanical shutter 22, which is open during the live view, and then opening the mechanical shutter 22 again (step S6).

Figure 3:
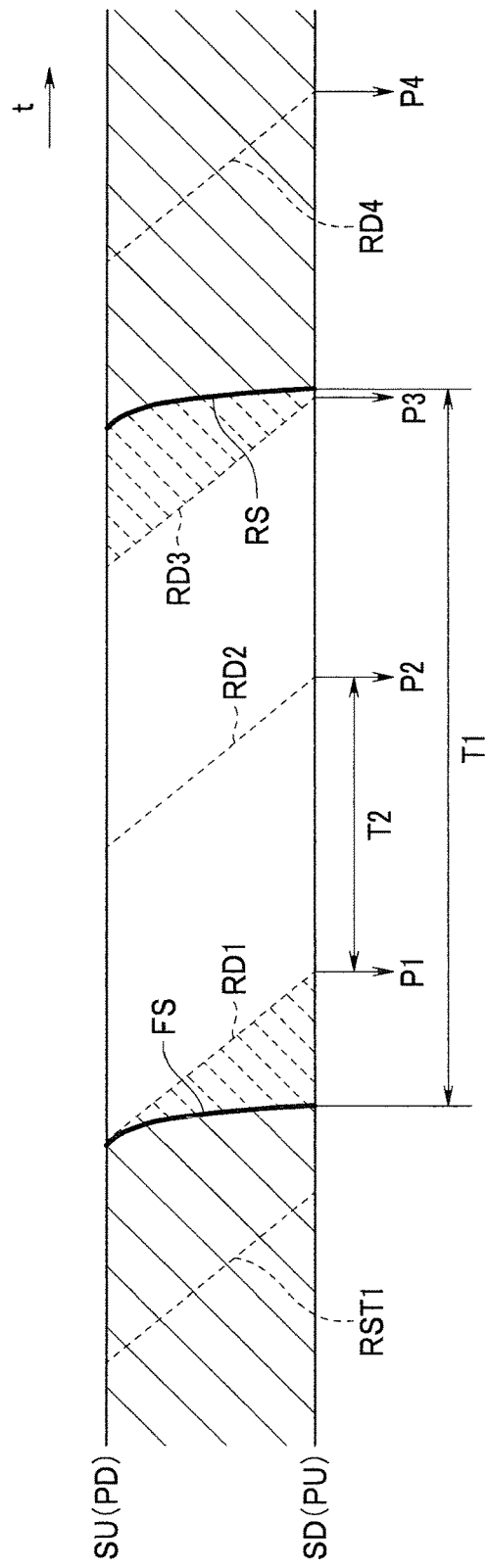
FIG. 3 is a timing chart showing a state of exposure in a panning-photographing mode in the first embodiment.

FIG. 3 is a timing chart showing a state of exposure in the panning-photographing mode. In FIG. 3, an upper side is an upper side SU of the image sensor 23 (since an optical image is reversed and formed by the lens 21, a lower side PD of an image) and a lower side is a lower side SD of the image sensor 23 (due to the same reason, an upper side PU of the image). A right side in FIG. 3 is a progressing direction of time t.

In an example shown in FIG. 3, the system control section 10 sequentially resets (RST1) respective lines of the image sensor 23 in order to enable exposure of an image of a first frame, then starts traveling of a front curtain FS of the mechanical shutter 22, and, for example, simultaneously with the traveling start of the front curtain FS, starts sequential readout RD1 of each of lines of an image P1 of the first frame (step S7).

At this point, the system control section 10 resets a timer for measuring the one-frame exposure time $T2$ and a timer for measuring the total exposure time $T1$ and starts a clocking operation.

The read-out image P1 of the first frame is stored in the internal memory 9 (step S8).

The readout RD1 of the image P1 of the first frame is equal to an exposure start of an image P2 of a second frame.

In the exposure start of the second frame (or subsequent frames), since the mechanical shutter 22 is kept open, when the electronic shutter, readout of a certain image of which is an exposure start of the next image, is used, consecutive photographing is performed without exposure being interrupted. In this way, it is possible to perform the consecutive photographing without causing exposure omission among the frames. It is possible to prevent a track of the moving object in a final combined image from being interrupted.

After starting the exposure of the image P2 of the second frame, the system control section 10 determines on the basis of a measurement result of the timer whether or not the one-frame exposure time $T2$ has elapsed (step S9). When the one-frame exposure time $T2$ has not elapsed, the system control section 10 stands by for elapse of the one-frame exposure time $T2$ while continuing the exposure.

When determining in step S9 that the one-frame exposure time $T2$ has elapsed, the system control section 10 resets the timer for measuring the one-frame exposure time $T2$ to start measurement of the one-frame exposure time $T2$ anew and reads out image data from the image sensor 23 (step S10). The system control section 10 stores the read-out image data in the internal memory 9 (step S11).

The system control section 10 determines on the basis of a measurement result of the timer whether or not the total exposure time $T1$ has elapsed (step S12).

When determining in step S12 that the total exposure time $T1$ has not elapsed, the system control section 10 returns to step S9 and performs exposure of the next image by the electronic shutter as explained above.

Every time the one-frame exposure time $T2$ elapses in this way, the system control section 10 performs electronic readout RD2, RD3, and the like from the image sensor 23 to acquire images P2, P3, and the like and performs new exposure while resetting the timer to clock new one-frame exposure time $T2$.

When determining in step S12 in this way that the total exposure time $T1$ has elapsed, in order to end the photographing, the system control section 10 causes the rear curtain RS of the mechanical shutter 22 to travel and closes the rear curtain RS (step S13).

In this way, the total exposure time $T1$ is a time period from the opening to the closing of the mechanical shutter 22 and is a period in which light reaches in any pixel. The total exposure time $T1$ is a total effective exposure time (a total time in which the light reaches) of images of a plurality of frames continuously electronically read out from the image sensor 23 in the panning-photographing mode. On the other hand, the one-frame exposure time T2 is a time interval (an image readout cycle) for reading out an image of one frame from the image sensor 23.

For example, as shown in FIG. 3, when causing the rear curtain RS to travel and closing the rear curtain RS after performing the readout RD3 of a third frame and before performing the readout RD4 of a fourth frame, the system control section 10 stores, in the internal memory 9, an image P4 acquired by the readout RD4 of the fourth frame, which is last one frame of the electronic readout consecutive photographing (step S14).

Subsequently, the system control section 10 performs, on the basis of the image data of the plurality of frames stored in the internal memory 9, the average combination processing with, for example, the average combination section 36 of the image combining section 31 to generate a combined image (step S15).

More specifically, when pixel data in a pixel position (x, y) of an image of an n-th (n is a positive integer) frame is represented as Pn(x, y), the number of frames of all images obtained by consecutive photographing is represented as N (N is a positive integer), and pixel data in a pixel position (x, y) of a combined image is represented as Pcomp(x, y), the average combination processing is processing for calculating Pcomp(x, y) according to the following Expression 1:

$$P_{comp}(x, y) = \frac{T2}{T1} \times \sum_{n=1}^{N} P_n(x, y)$$ [Expression 1]

In this way, the pixel data Pn(x, y) of all the N frames are added up for each of pixel positions corresponding thereto and then the addition result of the pixel data Pn(x, y) is multiplied with a coefficient T2/T1. Consequently, the pixel data Pcomp(x, y) in the combined image is a pixel value equivalent to a pixel value obtained from the pixels exposed for the one-frame exposure time T2.

If it is assumed that divided exposure is not performed in the one-frame exposure time T2, in which proper exposure is obtained, and pixel data of one frame exposed in the total exposure time T1 is multiplied with the coefficient T2/T1, when T1>T2, an obtained image of one frame is overexposed. Therefore, because of a saturation output level of a photodiode, a saturation level value inside the image sensor 23, a saturation level value of a digital circuit (the image processing section 3, etc.) in a later stage, and the like, pixels, pixel data of which is saturated and clipped, occur depending on an object and photographing conditions. The saturated and clipped pixel data has lost appropriate color information and luminance information. When the pixel data is multiplied with the coefficient T2/T1 (<1), an output is equal to or smaller than the saturation level value. The output is an unnatural output different from an actual object. However, among such pixels, pixels that are not saturated if photographing is performed in the one-frame exposure time T2 should also be present. Therefore, by performing the divided exposure in the one-frame exposure time T2 in which proper exposure is obtained, it is possible to prevent saturation of a pixel value and obtain an image having more natural color.

When it is determined in step S4 that the one-frame exposure time T2 is not shorter than the total exposure time T1, the one-frame exposure time T2 and the total exposure time T1 could have been set to be T2=T1 by adjusting the ISO sensitivity and the diaphragm value. In this case, as in step S5, the system control section 10 determines whether or not the second release switch is turned on (step S16), returns to step S1 until the second release switch is turned on, and repeatedly performs the processing explained above.

In this way, when determining in step S16 that the second release switch is turned on, the system control section 10 once closes the mechanical shutter 22, which is open during the live view, and then opens the mechanical shutter 22 again to thereby start exposure (step S17).

On the basis of a measurement result of the timer, the system control section 10 stands by for the total exposure time T1 (=T2) to elapse (step S18).

When determining in step S18 in this way that the total exposure time T1 has elapsed, in order to end the photographing, the system control section 10 causes the rear curtain RS of the mechanical shutter 22 to travel and closes the rear curtain RS (step S19).

Thereafter, the system control section 10 stores, in the internal memory 9, the average combination image data of the N frames generated in step S15 or the image data of one frame read out from the image sensor 23 after the exposure end in step S19 (step S20).

In this way, only when determining in step S4 that T1>T2 is satisfied, the system control section 10 performs electronic shutter control for time-dividing the total exposure time T1 by the mechanical shutter 22.

Subsequently, the development processing section 32 performs the development processing explained above on the image data stored in the internal memory 9 (step S21).

When the development processing is performed in this way, the system control section 10 stores the image data after the processing in the external memory 11 (step S22), displays the image data subjected to the resize processing on the display section 7 as a final recorded image (step S23), and returns from the panning photographing processing to not-shown main processing.

Subsequently, a combined image generated by combining images of a plurality of frames obtained by consecutive photographing in the panning photographing processing in the present embodiment is explained with reference to FIGS. 4 to 9.

Figure 4:
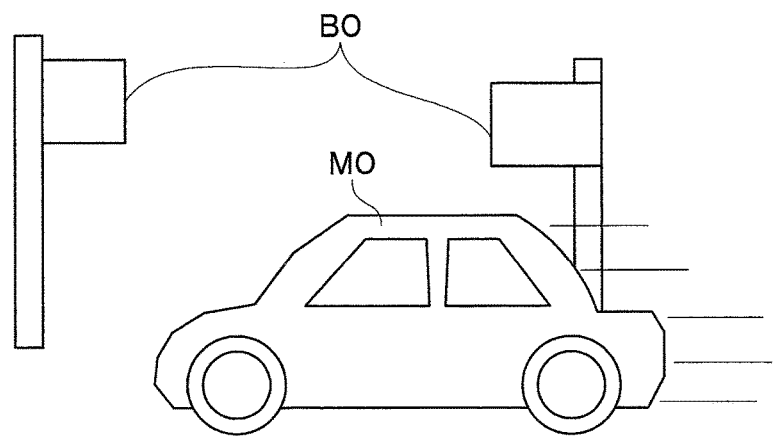
FIG. 4 is a diagram showing an example of a photographing scene including a moving object and a stationary background in the first embodiment.
Figure 5:
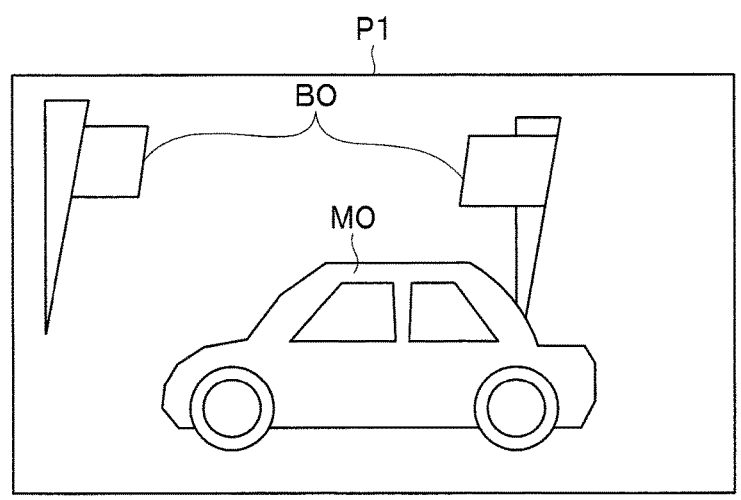
FIG. 5 is a diagram showing an example of an image obtained as a first frame of panning photographing in the first embodiment.
Figure 6:
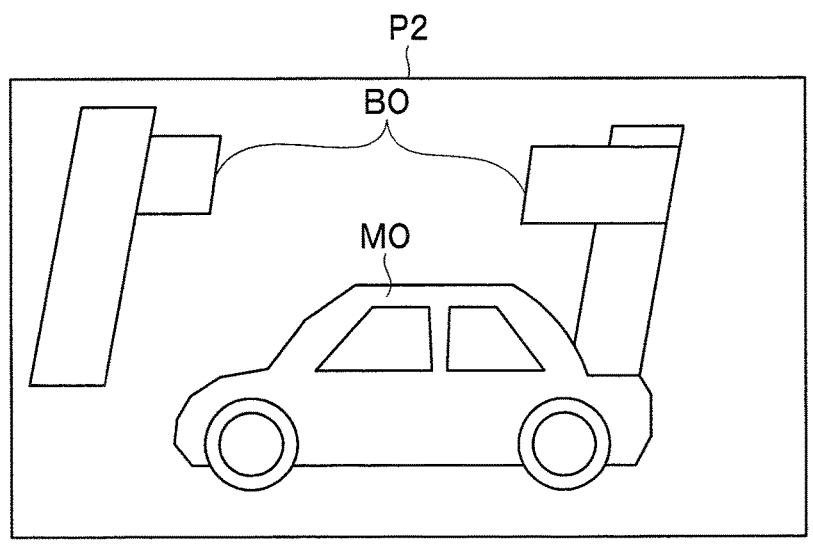
FIG. 6 is a diagram showing an example of an image obtained as a second frame of the panning photographing in the first embodiment.
Figure 7:
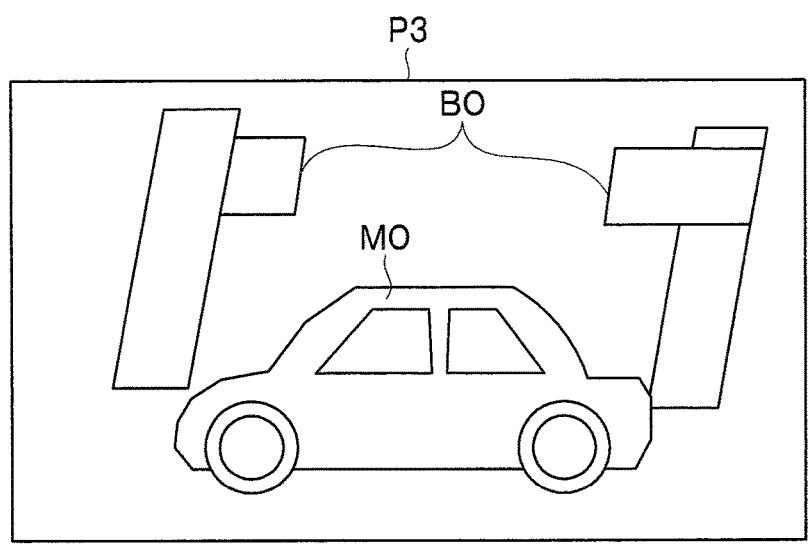
FIG. 7 is a diagram showing an example of an image obtained as a third frame of the panning photographing in the first embodiment.
Figure 8:
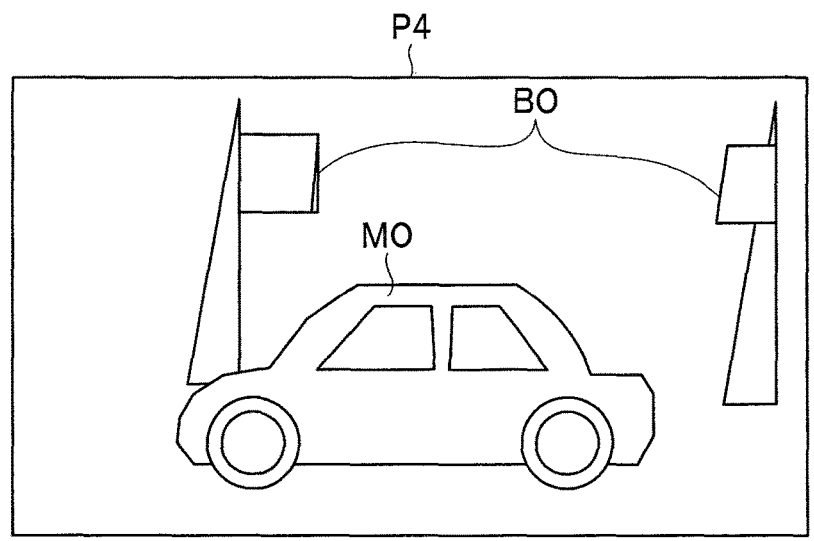
FIG. 8 is a diagram showing an example of an image obtained as a fourth frame, which is a last frame, of the panning photographing in the first embodiment.
Figure 9:
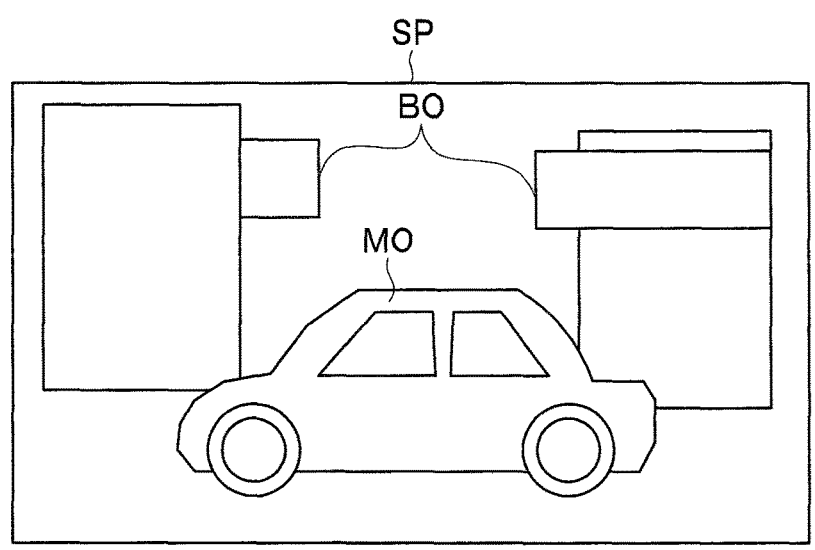
FIG. 9 is a diagram showing an example of an image generated by combining the images of all the frames obtained in the panning photographing in the first embodiment.

FIG. 4 is a diagram showing an example of a photographing scene including a moving object and a stationary background. FIG. 5 is a diagram showing an example of an image P1 obtained as a first frame of the panning photographing. FIG. 6 is a diagram showing an example of an image P2 obtained as a second frame of the panning photographing. FIG. 7 is a diagram showing an example of an image P3 obtained as a third frame of the panning photographing. FIG. 8 is a diagram showing an example of an image P4 obtained as a fourth frame, which is a last frame, of the panning photographing. FIG. 9 is a diagram showing an example of an image SP generated by combining the images of all the frames obtained in the panning photographing.

For example, as shown in FIG. 4, it is assumed that a main object MO such as a car traveling from a right side to a left side with respect to a stationary background BO is panning-photographed by directing the image pickup apparatus 1 to the main object MO and swinging the image pickup apparatus 1 from right to left.

As a flow of photographing, as in the example shown in FIG. 3, image data of four frames of images 1 to 4 is electronically read out and consecutively photographed in the one-frame exposure time T2, in which proper exposure is obtained, during the total exposure time T1 (however, concerning the first frame and the last frame, if exposure is performed to include a hatched portion indicated by a dotted line (that is, if pixel data irradiated with an object light image can be fully read out), an exposure time does not have to be the one-frame exposure time T2).

For the image P1 of the first frame, since the readout RD1 is immediately performed when the mechanical shutter 22 opens. Therefore, the exposure time is short on the upper side SU of the image sensor 23 (the lower side PD of the image) and is long on the lower side SD of the image sensor 23 (the upper side PU of the image). Therefore, as shown in FIG. 5, the image P1 is an image in which, because of the panning photographing, further on an upper side of the image, the background BO other than the main object MO is further panned from the left to the right opposite to the direction in which the image pickup apparatus 1 is swung.

In the image P2 of the second frame shown in FIG. 6 and the image P3 of the third frame shown in FIG. 7, exposure timing of respective rows sequentially shifts from a lower side toward an upper side in the images. Therefore, the background BO is a deformed image that shifts to a left side toward the lower side of the image and to a right side toward the upper side of the image.

In the image P4, which is the last one frame, shown in FIG. 8, since the mechanical shutter 22 is closed during the exposure and light is blocked, unlike the image P1, the exposure time is long on the upper side SU of the image sensor 23 (the lower side PD of the image) and is short on the lower side SD of the image sensor 23 (the upper side PU of the image). Therefore, in the image P4, panning of the background BO is smaller further on the upper side and is larger further on the lower side.

Figure 11:
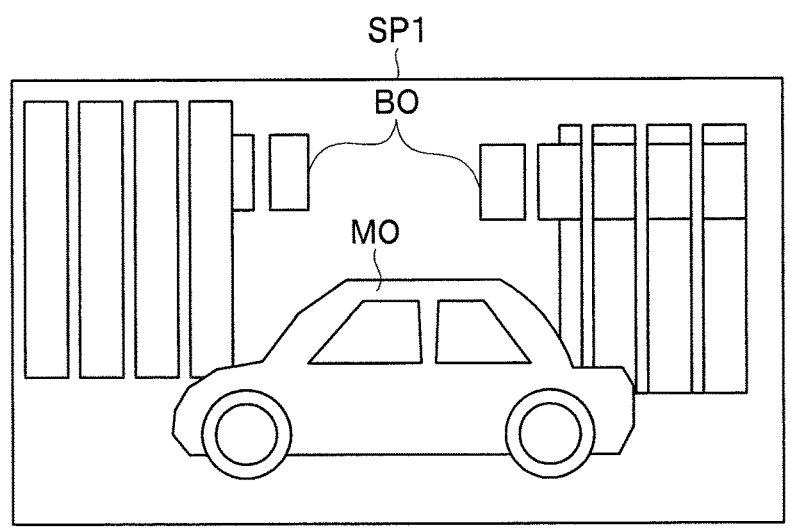
FIG. 11 is a diagram showing an example of a panning-photographed image generated by combining images of a plurality of frames consecutively photographed by a mechanical shutter in the past.
Figure 12:
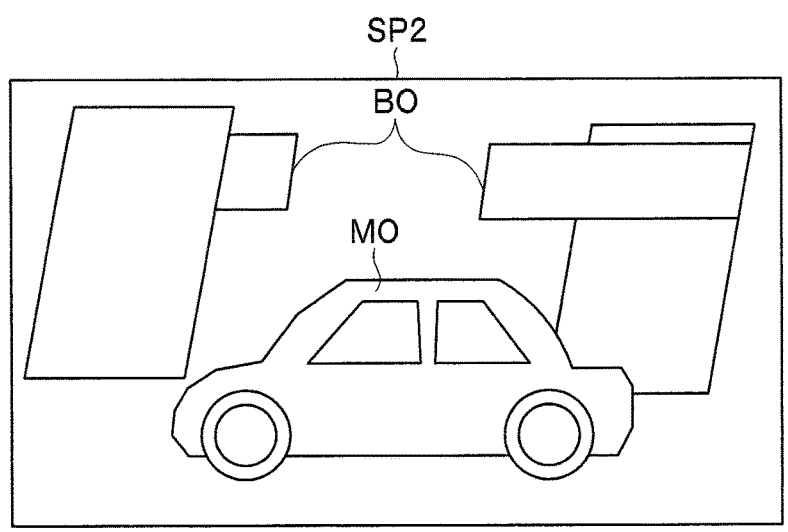
FIG. 12 is a diagram showing an example of a panning-photographed image generated by combining images of a plurality of frames consecutively photographed by an electronic shutter in the past.

When these images of the four frames are combined as explained above, the combined image SP having proper exposure photographed in the total exposure time T1 shown in FIG. 9 is obtained. In the combined image SP shown in FIG. 9, unlike the panning-photographed image SP1 generated by combining the images of the plurality of frames consecutively photographed by the mechanical shutter 22 shown in FIG. 11, interruption of the panning of the background BO due to exposure omission among images does not occur. Further, in the combined image shown in FIG. 9, unlike the panning-photographed image SP2 generated by combining the images of the plurality of frames consecutively photographed by the electronic shutter shown in FIG. 12, unnatural distortion of the background BO does not occur either.

Incidentally, when readout of an image is performed in order from a first row toward a final row, in the example shown in FIG. 3, after a last row of an image of a certain frame is read out, a first row of an image of the next frame is read out. However, when an object is bright and the one-frame exposure time T2, in which proper exposure is obtained, needs to be further reduced, in some case, before a last row of an image of a certain frame is read out, a first row of an image of the next frame is read out (in the image sensor 23 having a plurality of readout channels, such simultaneous readout of a plurality of lines is possible). Such a more general example is explained with reference to FIG. 10.

Figure 10:
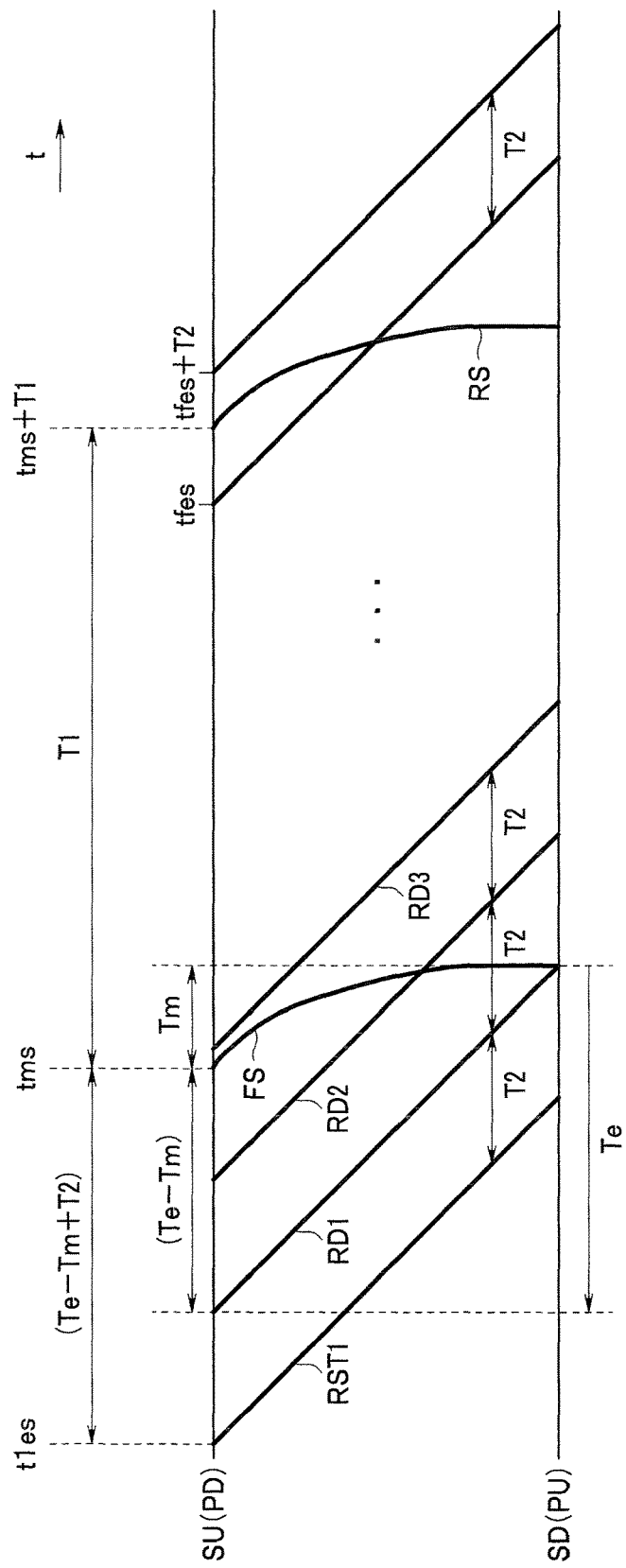
FIG. 10 is a timing chart for explaining a control method for continuously reading out, from an image sensor, image data of a plurality of frames for generating combined image data in the first embodiment.

FIG. 10 is a timing chart for explaining a control method for continuously reading out, from the image sensor 23, image data of a plurality of frames for generating a combined image data. In FIG. 10, as in FIG. 3, an upper side is the upper side SU of the image sensor 23 (the lower side PD of an image), a lower side is the lower side SD of the image sensor 23 (the upper side PU of the image), and a right side is a progressing direction of the time t.

Respective signs shown in FIG. 10 including the signs already explained are as described below.

T1: total exposure time
T2: one-frame exposure time (T2<T1)
Tm: traveling time of the mechanical shutter (the front curtain and the rear curtain)
Te: readout time for all lines (traveling time of a so-called electronic shutter)
tms: mechanical shutter front curtain traveling start time
tles: first-frame electronic front curtain traveling start time
tfes: last-frame electronic front curtain traveling start time The system control section 10 performs control explained below such that electric charges exposed in any pixel in the total exposure time T1 are fully read out (electric charges exposed in a dotted line hatching portion in FIG. 3 are fully read out in the same manner as other exposed electric charges).

That is, the system control section 10 controls the mechanical shutter 22 and the image sensor 23 to satisfy the following Expression 2:

$$(tms-Te+Tm-T2) < tles \leq (tms-Te+Tm) \quad \text{[Expression 2]}$$

and the following Expression 3:

$$(tms+T1-T2) \leq tfes < (tms+T1) \quad \text{[Expression 3]}$$

Expression 2 is a conditional expression for placing traveling start time tles of a first frame electronic front curtain after time (tms−Te+Tm−T2) going back (Te−Tm+T2) from mechanical shutter front curtain traveling start time tms and before time (tms−Te+Tm) going back (Te−Tm) from the mechanical shutter front curtain traveling start time tms.

Expression 3 is an expression obtained by rearranging a conditional expression tfes<(tms+T1) and (tms+T1)≤(tfes+T2) for setting, as a last frame, a frame in which the last-frame electronic front curtain traveling start time tfes is before mechanical shutter rear curtain traveling start time (tms+T1) and (tfes+T2) is simultaneous with or after the mechanical shutter rear curtain traveling start time (tms+T1).

Note that, in the above explanation, the start of the total exposure time T1 in the respective pixels is performed by the traveling of the front curtain of the mechanical shutter 22. However the start of the total exposure time T1 is not limited to this. For example, it is also possible to use a front curtain electronic shutter photographing function for starting exposure with a front curtain electronic shutter and ending the exposure with the rear curtain of the mechanical shutter 22 by matching a traveling characteristic of a pixel reset operation of the image sensor 23 (an operation for resetting electric charges accumulated in a pixel) (a front curtain electronic shutter) with a traveling characteristic of the mechanical shutter 22 to perform the pixel reset operation.

Traveling speed of the electronic shutter is lower than traveling speed of the mechanical shutter 22. One cause of this is that time is required to A/D-convert a read-out pixel value. However, since the A/D conversion is unnecessary in the pixel reset, it is possible to match the traveling characteristic with the traveling characteristic of the mechanical shutter 22.

In this case, the system control section 10 causes, instead of the front curtain of the mechanical shutter 22, the image sensor 23 to perform an operation of the front curtain electronic shutter for ending reset of signal charges and start exposure at speed equivalent to traveling speed of the front curtain of the mechanical shutter 22 (because reset end timing is exposure start timing).

By using the front curtain electronic shutter for the start of the total exposure time T1, it is possible to attain an effect substantially the same as the effect of using the front curtain of the mechanical shutter 22. Further, since it is unnecessary to perform, during the exposure start, a mechanical operation in the case of the driving of the front curtain of the mechanical shutter 22. Therefore, it is possible to suppress vibration and a blur that occur in the image pickup apparatus 1. It is possible to photograph a high-quality image with lower vibration and fewer blurs. Further, if the front curtain electronic shutter is used for the start of the total exposure time T1, the operation for once closing the mechanical shutter during the photographing start and opening the mechanical shutter 22 (the operation in step S6 of FIG. 2) is unnecessary. Therefore, a release time lag (time required from turning-on of the second release switch to a start of exposure of a first frame) is reduced. It is possible to start photographing at timing intended by the photographer.

In the present embodiment, the one-frame exposure time T2 is the exposure time in which the proper exposure is obtained. However, a general digital camera including an image stabilization function has a function of automatically setting shutter speed to a time period in which influence of a camera shake (including an object shake or the like) can be neglected (a time period in which the influence of the camera shake hardly appears in an image) and performing photographing.

More specifically, the ISO sensitivity and the diaphragm value are adjusted to set the shutter speed to certain determined shutter speed (e.g., 1/250 (sec) or less). Alternatively, taking into account magnitude of a blur obtained by detecting a camera shake and a focal length of a lens, the shutter speed is set to shutter speed at which influence of the camera shake can be neglected.

Therefore, the system control section 10 can set time T3, in which the influence of the camera shake can be neglected, for example to a predetermined time period or calculate the time T3 on the basis of the focal length of the lens 21 and a detection result of the blur detecting section 6, which is an acceleration detecting section.

Therefore, the system control section 10 may compare the time T3 calculated in this way and the one-frame exposure time T2, in which proper exposure is obtained. When T3<T2, the system control section 10 may perform the electronic readout consecutive photographing directly using the processing explained above by setting anew, as the one-frame exposure time T2, a time period equal to or shorter than the time T3 in which the influence of the camera shake can be neglected.

By performing such processing, the main object in the respective frames obtained by performing the consecutive photographing does not blur. Therefore, by performing the positional shift correction to match the position of the main object and then performing the image combination, it is possible to obtain a panning-photographed image conforming to the intention of the photographer and without a blur in the main object.

According to the first embodiment, control is performed to continuously read out the image data of the plurality of frames in the one-frame exposure time T2 and fully read out electric charges exposed in any pixel in the total exposure time T1. Therefore, an exposure time of an object moving relatively to the image pickup apparatus 1 is regulated by the traveling of the front curtain and the rear curtain of the mechanical shutter 22. It is possible to obtain a natural combined image in which discontinuity of exposure and object distortion are reduced.

In this way, it is possible to obtain, with the image combination, a panning-photographed image without any unnatural point compared with even an image photographed in photographing of one frame with the mechanical shutter 22 by a photographer familiar with operation of the image pickup apparatus 1.

At this point, the system control section 10 controls the mechanical shutter 22 and the image sensor 23 to satisfy Expression 2 and Expression 3. Therefore, it is possible to surely fully read out electric charges of any pixel, exposure of which is started by the mechanical shutter front curtain traveling and ended by mechanical shutter rear curtain traveling.

The photographer can set and input photographing conditions including the total exposure time T1 as desired via the input IF 8, which is a user interface section.

On the other hand, when the system control section 10 sets the total exposure time T1 as a time period suitable for the panning photographing on the basis of at least one of the focal length of the lens 21 and the detection result of the blur detecting section 6 also functioning as the acceleration detecting section, even a photographer not having knowledge concerning the time period suitable for the panning photographing can perform panning photographing in which a panning amount of the background is appropriate.

The system control section 10 performs the electronic shutter control only when T1>T2 is satisfied. Therefore, it is possible to reduce processing performed when the divided exposure is unnecessary.

The image combining section 31 generates combined image data using at least one combination method among the addition combination, the average combination, the comparative bright combination, the comparative dark combination, and the weighted addition combination. Therefore, it is possible to perform image combination having various effects and photograph images having different textures according to preference of the photographer.

Further, by using the front curtain electronic shutter instead of the front curtain of the mechanical shutter 22, it is possible to generate a combined image without artificiality even in photographing of the front curtain electronic shutter adopted in digital cameras in recent years.

In addition, the system control section 10 can suppress a blur of a combined image by setting the one-frame exposure time T2 to be equal to or shorter than the time T3 in which the influence of the camera shake can be neglected.

When the image pickup apparatus 1 is set in the panning-photographing mode, by setting the total exposure time T1, in which the mechanical shutter 22 is open, to the exposure time suitable for the panning photographing and setting the one-frame exposure time T2 of the electronic readout consecutive photographing to the exposure time in which proper exposure is obtained, it is possible to automate exposure control of the panning photographing and simplify photographing. Consequently, even when the total exposure time T1 is longer than the proper exposure time, it is possible to obtain a combined image with proper exposure without using an ND filter or the like.

Second Embodiment

A second embodiment of the present invention is explained with reference to, as appropriate, the respective figures referred to above. In the second embodiment, components same as the components in the first embodiment are, for example, denoted by the same reference numerals and signs and explanation of the components is omitted. Only differences are mainly explained.

When a combined image is generated from images of a plurality of frames obtained by consecutive photographing, if there is an object moving relatively to the image pickup apparatus 1 (which may be a moving object or even a stationary object corresponds to the relatively moving object when the image pickup apparatus 1 is moving), discontinuity of exposure occurs when the mechanical shutter consecutive photographing is used and object distortion occurs when the electronic readout consecutive photographing is used. This holds true not only in the case of the panning-photographing mode in the first embodiment but also in other photographing mode.

Therefore, the present embodiment is an embodiment concerning a handheld night scene mode.

Conventionally, in the handheld night scene mode, a high-speed shutter is set not to cause a blur in an image. ISO sensitivity is set to high sensitivity to enable high-speed shutter for a night scene with low luminance as well. However, the setting the ISO sensitivity to high sensitivity means increasing and amplifying an electric gain. Therefore, noise is also amplified and a generated image has a large noise amount. Therefore, images of a plurality of frames are further acquired. The acquired images of the plurality of frames are averaged and combined to smooth random noise and reduce a noise amount.

However, even in such a case, in the consecutive photographing in which only the mechanical shutter is used or the consecutive photographing in which only the electronic shutter is used, if there is an object moving relatively to the image pickup apparatus 1, artificiality occurs in a combined image as explained above.

Therefore, in the present embodiment, in the handheld night scene mode, as in the first embodiment explained above, the electronic readout consecutive photographing of a plurality of frames is performed while the mechanical shutter 22 is open, an exposure start of a first frame is performed by front curtain traveling of the mechanical shutter 22, and an exposure end of a last frame is performed by rear curtain traveling of the mechanical shutter 22.

In a specific photographing sequence, the processing in the present embodiment is performed when the photographer sets the image pickup apparatus 1 in the handheld night scene mode (which may be alternatively named average combination low-noise mode or the like) in advance.

When entering the processing in the handheld night scene mode, the system control section 10 determines the number of frames L necessary for reducing noise (because the random noise is further reduced when the number of frames L increases). However, the photographer may be capable of manually setting the number of frames L as desired.

Thereafter, as in the first embodiment, the system control section 10 sets the exposure time, in which proper exposure is obtained, or the time T3, in which influence of a camera shake can be neglected, to the one-frame exposure time T2. When the second release switch is turned on, the system control section 10 performs the electronic readout consecutive photographing for L frames at a T2 cycle, closes the mechanical shutter 22 when the consecutive photographing is completed, and ends the photographing.

Therefore, the total exposure time T1, which is time when the mechanical shutter 22 is open, only has to be equal to or longer than time (L×T2) necessary for performing the consecutive photographing of the number of frames L necessary for noise reduction.

Thereafter, after the image combining section 31 performs positional shift correction for image data of a plurality of frames of acquired images of all the L frames (positions the image data such that the main object overlaps), the system control section 10 subjects, with the average combination section 36, the image data to average combination processing to generate combined image data of at least one frame.

According to the second embodiment, it is possible to obtain a more natural combined image with discontinuity of exposure and object distortion reduced substantially as in the first embodiment. Further, even if a night scene is photographed by holding the image pickup apparatus 1 by hand, the influence of the camera shake is small and an image with low noise is obtained.

Third Embodiment

A third embodiment of the present invention is explained with reference to the respective figures referred to above as appropriate. In the third embodiment, components same as the components in the first and second embodiments are, for example, denoted by the same reference numerals and signs and explanation of the components is omitted as appropriate. Only differences are mainly explained.

The present embodiment is an embodiment concerning an exposure bracket photographing mode and an HDR (high dynamic range) combination mode.

First, the exposure bracket photographing mode is, for example, a mode for continuously photographing a proper exposure image, an underexposure image, and an overexposure image. Consequently, by continuously photographing a plurality of images with different exposure levels, a photographer can select an image with preferred exposure as desired after the photographing.

The HDR combination mode is a mode for acquiring image data of a plurality of frames with different exposure levels through exposure bracket photographing and combining the acquired image data of two or more frames with different exposure levels to thereby obtain a high dynamic range image having a wider dynamic range than image data of one frame. In specific HDR combination processing, for example, for respective image data of an underexposure image, a proper exposure image, and an overexposure image, pixel data in pixel positions corresponding to the image data are weighted and combined. At this point, the weight of the pixel data of the overexposure image is increased for a dark portion of an object, the weight of the pixel data of the underexposure image is increased for a bright portion of the object, and the pixel data are combined. Consequently, it is possible to obtain an image with a wide dynamic range in which black solid of an object dark portion and white void of an object bright portion do not occur.

In the present embodiment, the input IF 8 functions as a user interface section for setting the exposure bracket photographing mode and the HDR combination mode.

Exposure bracket photographing and photographing suitable for HDR combination are specifically explained.

In the following explanation, for example, when an exposure correction amount of a proper exposure image is set as 0 EV, for example, an underexposure image having an exposure correction amount under 0 EV by one stage (−1 EV) and an overexposure image having an exposure correction amount above 0 EV by one stage (+1 EV) are continuously photographed.

First, as in the first embodiment, in the automatic exposure control after the first release switch is turned on, the exposure time T, in which proper exposure is obtained, is detected on the basis of an image acquired by live view.

Subsequently, the one-frame exposure time T2 of electronic readout and the total exposure time T1, which is a time period in which the mechanical shutter 22 is open, are calculated as explained below on the basis of setting of bracket photographing.

More specifically, an exposure time for photographing the underexposure image of −1 EV is set to the one-fame exposure time T2 (however, the one-frame exposure time T2 is not prevented from becoming shorter than an exposure time of the underexposure image; for example, the one-frame exposure time T2 may be a time period obtained by further dividing the exposure time of the underexposure image into several exposure times). When the proper exposure time is represented as T, more specifically, the one-frame exposure time T2 is set to T2=T/2.

An exposure time for photographing the overexposure image of +1 EV is set to the total exposure time T1 (however, the total exposure time T1 is not prevented from becoming longer than an exposure time of the overexposure image). Consequently, more specifically, the total exposure time T1 is set to T1=2×T (=4×T2).

Therefore, when the exposure bracket photographing is set, the system control section 10 only has to set the total exposure time T1 to be equal to or longer than a maximum exposure time in the exposure bracket photographing and set the one-frame exposure time T2 to be equal to or shorter than a minimum exposure time in the exposure bracket photographing.

Thereafter, in photographing, as in the first embodiment, in a period in which the mechanical shutter 22 is open for the total exposure time T1, the system control section 10 performs electronic readout consecutive photographing at a T2 cycle, reads out images of a plurality of frames, and stores the images in the internal memory 9.

Subsequently, the system control section 10 combines, with the image combining section 31, the image data of the plurality of frames stored in the internal memory 9 and generates an exposure bracket image.

Pixel data in a pixel position (x, y) of an image of an n-th (n is a positive integer) is represented as Pn(x, y), the number of frames of all images obtained by consecutive photographing is represented as N (N is a positive integer), and pixel data in a pixel position (x, y) of combined image data of one-stage underexposure is represented as Pcomp(x, y:−1 EV), pixel data in a pixel position (x, y) of combined image data with proper exposure is represented as Pcomp(x, y:0 EV), and pixel data in a pixel position (x, y) of combined image data of one-stage overexposure is represented as Pcomp(x, y:+1 EV).

At this point, as indicated by the following Expression 4, the image combining section 31 adds up, with the addition combination section 35, pixel data Pn(x, y) of all the N frames and then multiplies the addition result with a ratio of exposure times (T2/T1) to thereby calculate the pixel data Pcomp(x, y:−1 EV).

$$P_{comp}(x, y: -1EV) = \frac{T2}{T1} \times \sum_{n=1}^{N} P_n(x, y)$$ [Expression 4]

Similarly, as indicated by the following Expression 5, the image combining section 31 adds up, with the addition combination section 35, the pixel data Pn(x, y) of all the N frames and then multiplies the addition result with the ratio of exposure times (T/T1) to thereby calculate the pixel data Pcomp(x, y:0 EV).

$$P_{comp}(x, y: 0EV) = \frac{T}{T1} \times \sum_{n=1}^{N} P_n(x, y)$$ [Expression 5]

Further, as indicated by the following Expression 6, the image combining section 31 adds up, with the addition combination section 35, the pixel data Pn(x, y) of all the N frames to thereby calculate the pixel data Pcomp(x, y:+1 EV).

$$P_{comp}(x, y: +1EV) = \sum_{n=1}^{N} P_n(x, y)$$ [Expression 6]

Therefore, the image combining section 31 combines all of the plurality of frames and generates combined image data of two or more frames with different exposure levels.

The conventional digital camera performs photographing three times respectively in the exposure times T1, T, and T2 using the mechanical shutter 22 to perform bracket photographing. Therefore, a time period of T1+T+T2 is required as only a total exposure time. Moreover, a time period and the like for charging the mechanical shutter 22 are also added every time the photographing is performed.

On the other hand, according to the present embodiment, image data of a plurality of frames necessary for the exposure bracket photographing can be generated by only opening and closing the mechanical shutter 22 once in the exposure time T1. Therefore, it is possible to reduce a total photographing time.

When a photographing time is long, an object moves during photographing and exposure changes. Further, for example, a way of reflection of the object (e.g., composition) also changes. However, with the configuration in the present embodiment, photographing in a short time is possible. Therefore, it is possible to reduce the changes and acquire a more desirable exposure bracket photographed image.

By subjecting exposure bracket images of two or more frames acquired as a combined image in this way to the HDR combination processing in the image processing section 3, it is possible to generate high dynamic range combined image data having a dynamic range wider than a normal one image (than combined image data of one frame before combination). In this case, in the conventional photographing method with a long photographing time, when an object moves during photographing, a combined image changes to an unnatural image such as a double image (or a triple image, etc.). However, in the photographing method in the present embodiment, since a photographing time is short, it is possible to prevent a combined image from changing to such an unnatural image.

According to the third embodiment, it is possible to obtain a more natural combined image with discontinuity of exposure and object distortion reduced substantially as in the first embodiment. Further, it is possible to perform the exposure bracket photographing in a short time. It is possible to acquire a desirable exposure bracket photographed image with fewer changes of composition.

Further, it is also possible to obtain a natural high dynamic range combined image that does not change to an unnatural multiple image.

Fourth Embodiment

A fourth embodiment of the present invention is explained with reference to the respective figures referred to above as appropriate. In the fourth embodiment, components same as the components in the first to third embodiments are, for example, denoted by the same reference numerals and signs and explanation of the components is omitted as appropriate. Only differences are mainly explained.

The present embodiment is an embodiment for realizing a digital ND filter function using image combination processing.

When an exposure mode of the image pickup apparatus 1 is set to a shutter speed priority mode (an S mode) or a manual setting mode (an M mode), a photographer designates shutter speed beforehand (the shutter speed is represented as T0).

At this point, when an object is bright, even if ISO sensitivity is reduced and a diaphragm is narrowed, exposure is sometimes overexposure. In this case, the conventional digital camera is unable to perform photographing with proper exposure. Therefore, the photographer attaches an optical ND filter to the image pickup apparatus 1 to reduce an incident light amount and performs treatment for obtaining proper exposure.

On the other hand, in the present embodiment, a function equivalent to the ND filter is realized by digital signal processing. Therefore, the present embodiment is referred to as digital ND filter mode.

More specifically, processing explained below is performed.

After the digital ND filter mode is set and shutter speed T0 is set, when the first release switch is turned on, the automatic exposure control section 5 automatically detects exposure conditions including the exposure time T in which proper exposure is obtained.

Subsequently, the system control section 10 determines whether the exposure time T is smaller than the shutter speed T0 (T<T0). When determining that the exposure time T is not smaller than the shutter speed T0, electronic readout consecutive photographing is unnecessary. The system control section 10 performs photographing of one frame using only the mechanical shutter 22.

When T=T0, exposure is proper exposure as it is. However, when T>T0, an image with insufficient exposure may be directly photographed by the mechanical shutter 22. For example, in the image pickup apparatus 1 mounted with a flash, the flash may be caused to emit light to supplement the insufficient exposure.

On the other hand, when determining that T<T0, since overexposure occurs if photographing is performed at the shutter speed T0, the system control section 10 sets the exposure time T, in which proper exposure is obtained, to the one-frame exposure time T2 of electronic readout and sets the shutter speed T0, which is set by the photographer, to the total exposure time T1 in which the mechanical shutter 22 is open.

However, the one-frame exposure time T2 is not prevented from being set shorter than the exposure time T in which proper exposure is obtained (may be set to, for example, T2=T/2). Therefore, when the total exposure time T1 is longer than the proper exposure time T, the system control section 10 sets the one-frame exposure time T2 to time equal to or shorter than the proper exposure time T and controls the mechanical shutter 22 and the image sensor 23.

In the photographing sequence after that, as in the first embodiment, it is sufficient to perform the electronic readout consecutive photographing in a period in which the mechanical shutter 22 is open and combine photographed image data of a plurality of frames on the basis of Expression 1 described above.

According to the fourth embodiment, it is possible to obtain a more natural combined image with discontinuity of exposure and object distortion reduced substantially as in the first embodiment. Further, even when the object is bright, it is possible to perform photographing with proper exposure at the shutter speed T0 set by the photographer without using the ND filter.

Therefore, the photographer is capable of easily performing desired slow shutter photographing without caring about exposure of an image.

Note that, in the embodiment of the present invention, the digital camera is explained as the example of the apparatus for photographing. However, the image pickup apparatus 1 may be either a digital single-lens reflex camera or a compact digital camera or may be the image pickup apparatus 1 for moving images such as a video camera or a movie camera. Further, the image pickup apparatus 1 may be the image pickup apparatus 1 incorporated in a cellular phone, a smart phone, a portable information terminal (PDA: personal digital assistant), a game machine, or the like. In any case, the present invention can be widely applied to apparatuses for photographing capable of performing photographing by the mechanical shutter 22 and photographing electronic shutter readout photographing.

In the embodiment, the example is explained in which the present invention is applied to the apparatus for photographing. However, the present invention is not limited to this. Naturally, it is also possible to acquire image data of a plurality of frames from a photographing start to a photographing end in the image pickup apparatus and apply the image processing explained in the embodiment to the acquired image data of the plurality of frames in another image processing apparatus and the like.

Further, concerning the claims, the specification, and the flowcharts in the drawings, even if the description is made using words expressing order such as "first", "next", and "thereafter" for convenience, in sections in which such description is not particularly made, this does not mean that it is essential to carry out the processing in this order.

In the above explanation, the image pickup apparatus is mainly explained. However, the present invention may be an image pickup method for performing processing same as the processing of the image pickup apparatus or may be a processing program for causing a computer to perform processing same as the processing of the image pickup apparatus, a computer-readable non-transitory recording medium that records the processing program, and the like.

For example, in the technique explained in this specification, the control explained mainly in the flowcharts is often executable by a processing program. The processing program is sometimes stored in a recording medium or a recording section. The recording of the processing program in the recording medium or the recording section may be performed during product shipment, may be performed using a distributed recording medium, or may be downloaded via a communication line such as the Internet.

Note that the respective sections explained above may be configured as circuits. Any circuit may be implemented as a single circuit or may be implemented as a combination of a plurality of circuits if the circuit can perform the same function. Further, any circuit is not limited to a circuit configured as a dedicated circuit for performing an intended function and may be a configuration that performs the intended function by causing a general-purpose circuit to execute a processing program.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image pickup apparatus comprising:
   an image pickup device configured to receive an object light image in a plurality of two-dimensionally arrayed pixels, generate image data, and read out the image data in a readout time Te;
   a mechanical shutter disposed on a front surface of the image pickup device and configured to control an exposure time of the image pickup device according to opening and closing actions in a traveling time Tm that satisfies Te>Tm;
   a control section configured to control the mechanical shutter to set a total exposure time from opening to closing of the mechanical shutter to T1 and control, with an electronic shutter, the image pickup device to continuously read out image data of a plurality of frames in a one-frame exposure time T2 that satisfies T1>T2; and
   an image combining section configured to combine the image data of the plurality of frames to generate combined image data of at least one frame, wherein
   the control section performs control to fully read out electric charges exposed in any pixel in the total exposure time T1, wherein, when time when a front curtain of the mechanical shutter starts traveling is represented as tms, time when a front curtain of the electronic shutter starts traveling in photographing a first frame among the plurality of frames is represented as tles, and time when the front curtain of the electronic shutter starts traveling in photographing a last frame is represented as tfes, the control section controls the mechanical shutter and the image pickup device to satisfy:

$(tms-Te+Tm-T2) < tles \leq (tms-Te+Tm);$ and $(tms+T1-T2) \leq tfes < (tms+T1).$ 2. The image pickup apparatus according to claim 1, further comprising:
   an automatic exposure control section configured to automatically detect exposure conditions including a proper exposure time; and
   a user interface section for setting and inputting photographing conditions including the total exposure time T1, wherein
   the control section sets the proper exposure time to the one-frame exposure time T2 and, only when the T1>T2 is satisfied, performs the electronic shutter control.

3. The image pickup apparatus according to claim 1, further comprising:
   an automatic exposure control section configured to automatically detect exposure conditions including a proper exposure time;
   a lens configured to form an object light image on the image pickup device; and
   an acceleration detecting section configured to detect acceleration, wherein
   the control section sets the proper exposure time to the one-frame exposure time T2, sets the total exposure time T1 as a period of time suitable for panning photographing on the basis of at least one of a focal length of the lens and a detection result of the acceleration detecting section, and, only when the 11>T2 is satisfied, performs the electronic shutter control.

4. The image pickup apparatus according to claim 1, further comprising an automatic exposure control section configured to automatically detect exposure conditions including a proper exposure time, wherein
   the control section sets one of the proper exposure time and a time period in which influence of a camera shake can be neglected, to the one-frame exposure time T2, determines a number of frames L necessary for reducing noise, sets the total exposure time T1 to be equal to or longer than L×T2, controls the mechanical shutter, and controls the image pickup device with the electronic shutter.

5. The image pickup apparatus according to claim 1, further comprising a user interface section for setting exposure bracket photographing, wherein
   when the exposure bracket photographing is set, the control section sets the total exposure time T1 to be equal to or longer than a maximum exposure time in the exposure bracket photographing and sets the one-frame exposure time T2 to be equal to or shorter than a minimum exposure time in the exposure bracket photographing, and
   the image combining section combines all of the plurality of frames to generate combined image data of two or more frames with different exposure levels.

6. The image pickup apparatus according to claim 5, wherein the image combining section further combines the combined image data of the two or more frames and generates high dynamic range combined image data having a dynamic range wider than combined image data of one frame before the combination.

7. The image pickup apparatus according to claim 1, further comprising:
   an automatic exposure control section configured to automatically detect exposure conditions including a proper exposure time; and
   a user interface section for setting and inputting photographing conditions including the total exposure time T1, wherein
   when the total exposure time T1 is longer than the proper exposure time, the control section sets the one-frame exposure time T2 to a time period equal to or shorter than the proper exposure time and controls the mechanical shutter and the image pickup device.

8. The image pickup apparatus according to claim 1, wherein the image combining section generates combined image data using at least one combining method among addition combination, average combination, comparative bright combination, comparative dark combination, and weighted addition combination.

9. The image pickup apparatus according to claim 1, wherein the control section causes, instead of the front curtain of the mechanical shutter, the image pickup device to perform an operation of a front curtain electronic shutter for ending reset of signal charges and starting exposure at speed equivalent to traveling speed of the front curtain of the mechanical shutter.

10. The image pickup apparatus according to claim 1, wherein the control section sets the one-frame exposure time T2 to be equal to or shorter than a time period in which influence of a camera shake can be neglected.

11. An image pickup method comprising:
- an image pickup step for receiving an object light image in a plurality of two-dimensionally arrayed pixels of an image pickup device, generating image data, and reading out the image data in a readout time Te;
- an exposure step for controlling, with a mechanical shutter disposed on a front surface of the image pickup device, an exposure time of the image pickup device according to opening and closing actions in a traveling time Tm that satisfies Te>Tm;
- a control step for controlling the mechanical shutter to set a total exposure time from opening to closing of the mechanical shutter to T1 and controlling, with an electronic shutter, the image pickup device to continuously read out image data of a plurality of frames in a one-frame exposure time T2 that satisfies T1>T2; and
- an image combining step for combining the image data of the plurality of frames to generate combined image data of at least one frame, wherein the control step is a step for performing control to fully read out electric charges exposed in any pixel in the total exposure time T1 wherein, when time when a front curtain of the mechanical shutter starts traveling is represented as tms, time when a front curtain of the electronic shutter starts traveling in photographing a first frame among the plurality of frames is represented as tles, and time when the front curtain of the electronic shutter starts traveling in photographing a last frame is represented as tfes, the mechanical shutter and the image pickup device are controlled to satisfy:

$(tms-Te+Tm-T2)<tles \leq (tms-Te+Tm)$;

and $(tms+T1-T2) \leq tfes < (tms+T1)$.

\* \* \* \* \*